United States Patent
Yoon et al.

(10) Patent No.: US 12,269,377 B2
(45) Date of Patent: Apr. 8, 2025

(54) VEHICLE SEATBACK FOLDING DEVICE

(71) Applicant: HYUNDAI TRANSYS INC., Seosan-si (KR)

(72) Inventors: Cheol Hwan Yoon, Hwaseong-si (KR); Kyeong Ju Kim, Hwaseong-si (KR); Hwa Young Mun, Hwaseong-si (KR); Jung Bin Lee, Hwaseong-si (KR); Jun Sik Hwang, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 127 days.

(21) Appl. No.: 18/022,005

(22) PCT Filed: Aug. 17, 2021

(86) PCT No.: PCT/KR2021/010866
§ 371 (c)(1),
(2) Date: Feb. 17, 2023

(87) PCT Pub. No.: WO2022/039464
PCT Pub. Date: Feb. 24, 2022

(65) Prior Publication Data
US 2023/0347797 A1 Nov. 2, 2023

(30) Foreign Application Priority Data
Aug. 21, 2020 (KR) .................. 10-2020-0104996

(51) Int. Cl.
*B60N 2/20* (2006.01)
*B60N 2/225* (2006.01)
*B60N 2/30* (2006.01)

(52) U.S. Cl.
CPC ............ *B60N 2/20* (2013.01); *B60N 2/2255* (2013.01); *B60N 2/3009* (2013.01); *B60N 2/3011* (2013.01)

(58) Field of Classification Search
CPC ...... B60N 2/2255; B60N 2/2227; B60N 2/20; B60N 2/3011
(Continued)

(56) References Cited

U.S. PATENT DOCUMENTS 7,819,479 B2 * 10/2010 Halbig .................. B60N 2/206
297/378.12
8,985,691 B2 * 3/2015 Tsuruta ................ B60N 2/2356
297/331

(Continued)

FOREIGN PATENT DOCUMENTS

KR   100455044 B1 * 11/2004
KR   20060074432 A * 7/2006
(Continued)

OTHER PUBLICATIONS

International Search Report, PCT/KR2021/010866, Nov. 24, 2021.

*Primary Examiner* — Timothy J Brindley
(74) *Attorney, Agent, or Firm* — Quantum Patent Law Firm; Seongyoune Kang

(57) ABSTRACT

A vehicle seatback folding device includes: a cushion bracket; a back side frame rotating on the cushion bracket; a spring mounting bracket coupled to rotate integrally with the back side frame around a hinge-coupling part; a return spring for applying, to the back side frame, elastic restoring force for rotating the back side frame in the folding direction of a seatback; and a reverse spring supported in a state in which a first end portion is caught by the spring mounting bracket and a second end portion is caught by a first spring support end.

20 Claims, 8 Drawing Sheets

(58) Field of Classification Search
USPC .................. 297/301.4, 292, 378.4, 378.14
See application file for complete search history.

(56) References Cited

U.S. PATENT DOCUMENTS

| | | |
|---|---|---|
| 10,071,656 B2 * | 9/2018 | Wetzig ................ B60N 2/2213 |
| 11,607,976 B2 * | 3/2023 | Schmitz ............ B60N 2/42709 |
| 2006/0170269 A1 * | 8/2006 | Oki ........................ B60N 2/236 |
| | | 297/367 R |
| 2010/0026073 A1 | 2/2010 | Bruck et al. |

FOREIGN PATENT DOCUMENTS

| | | |
|---|---|---|
| KR | 10-2012-0072602 A | 7/2012 |
| KR | 10-1576383 B1 | 12/2015 |
| KR | 10-1716975 B1 | 3/2017 |
| KR | 10-2018-0112296 A | 10/2018 |
| KR | 20240106330 A * | 7/2024 |

* cited by examiner

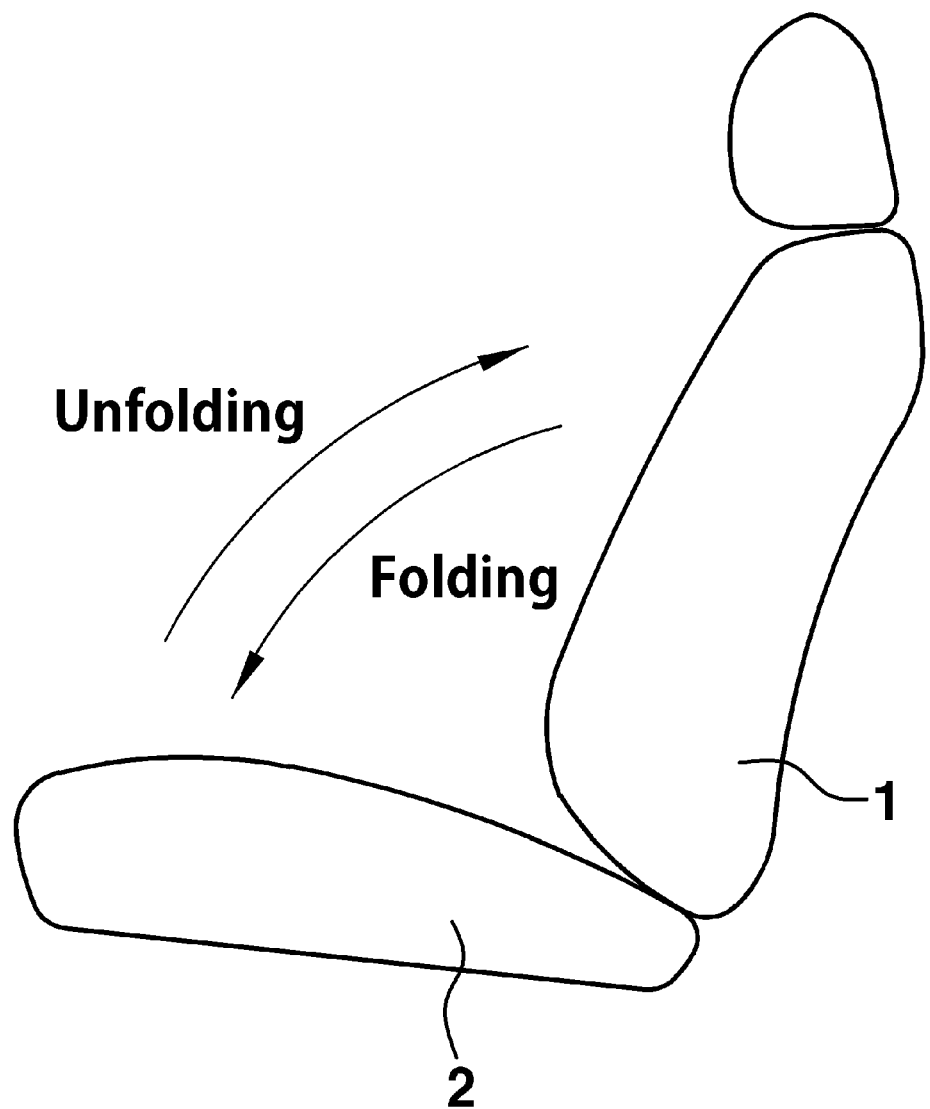
【FIG. 1】

[FIG. 2]
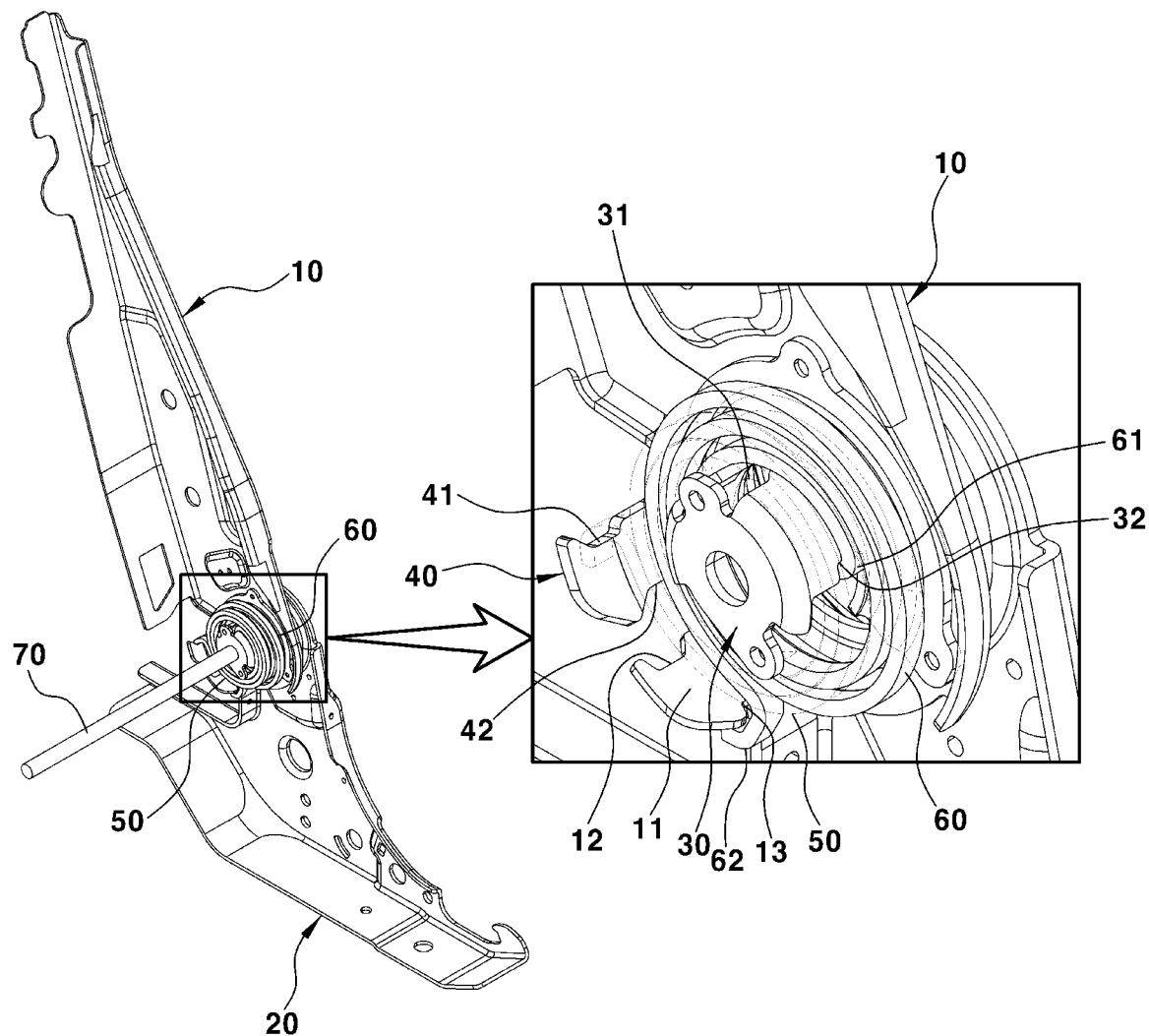

[FIG. 3]
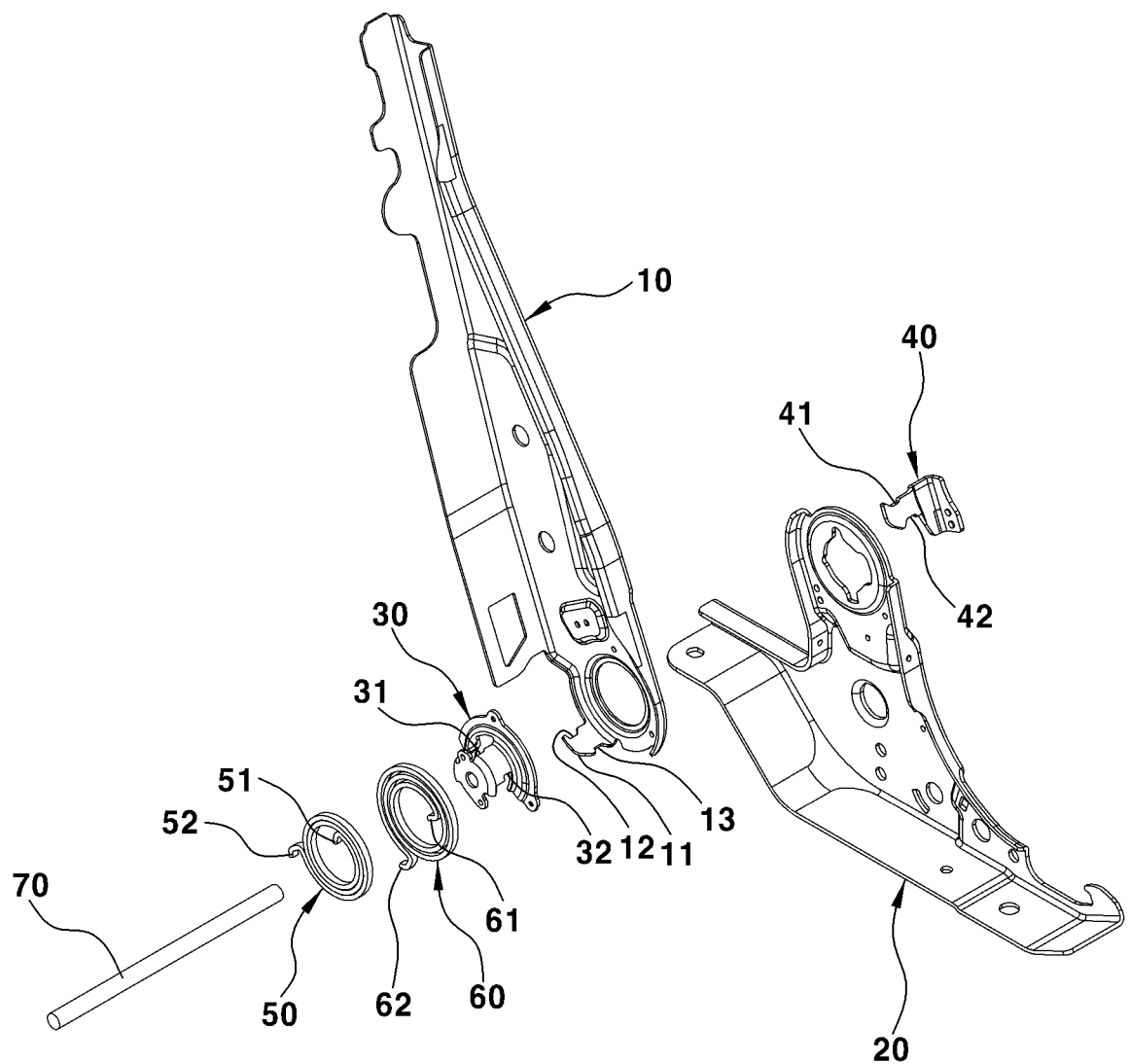

[FIG. 4]
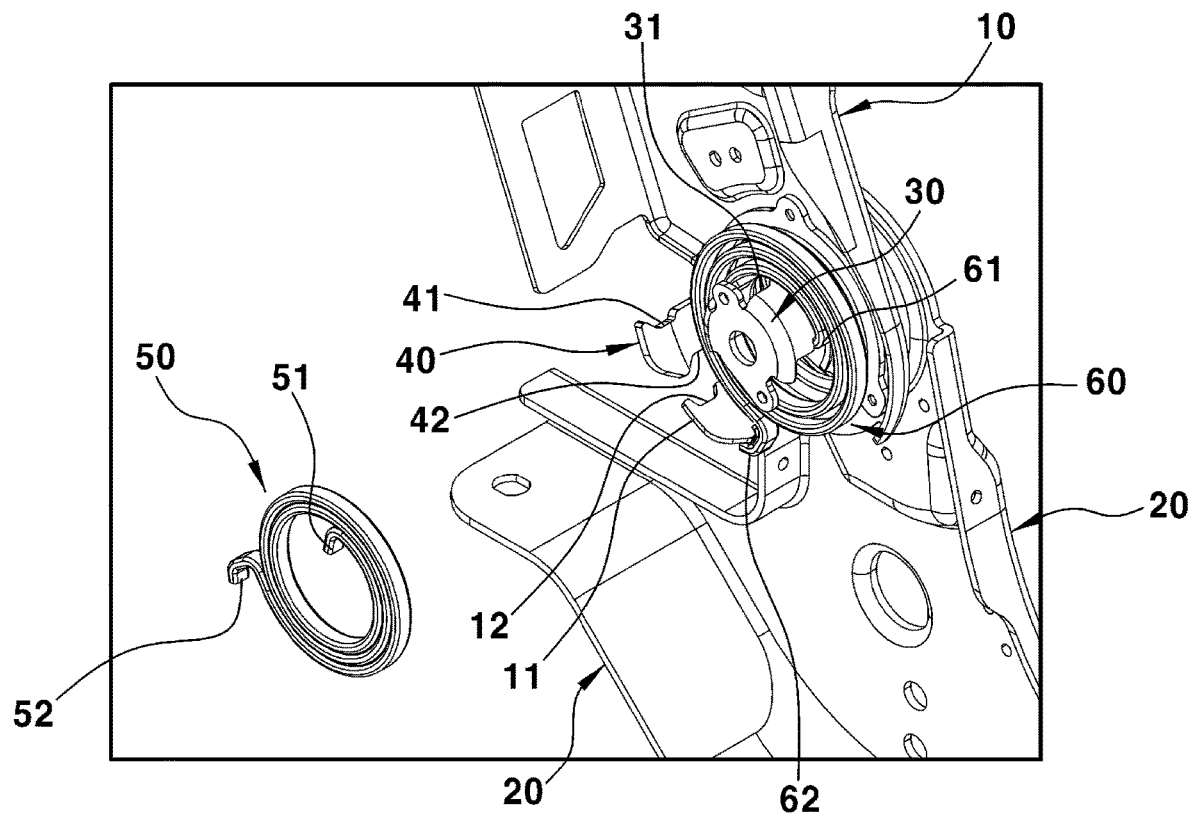

[FIG. 5]
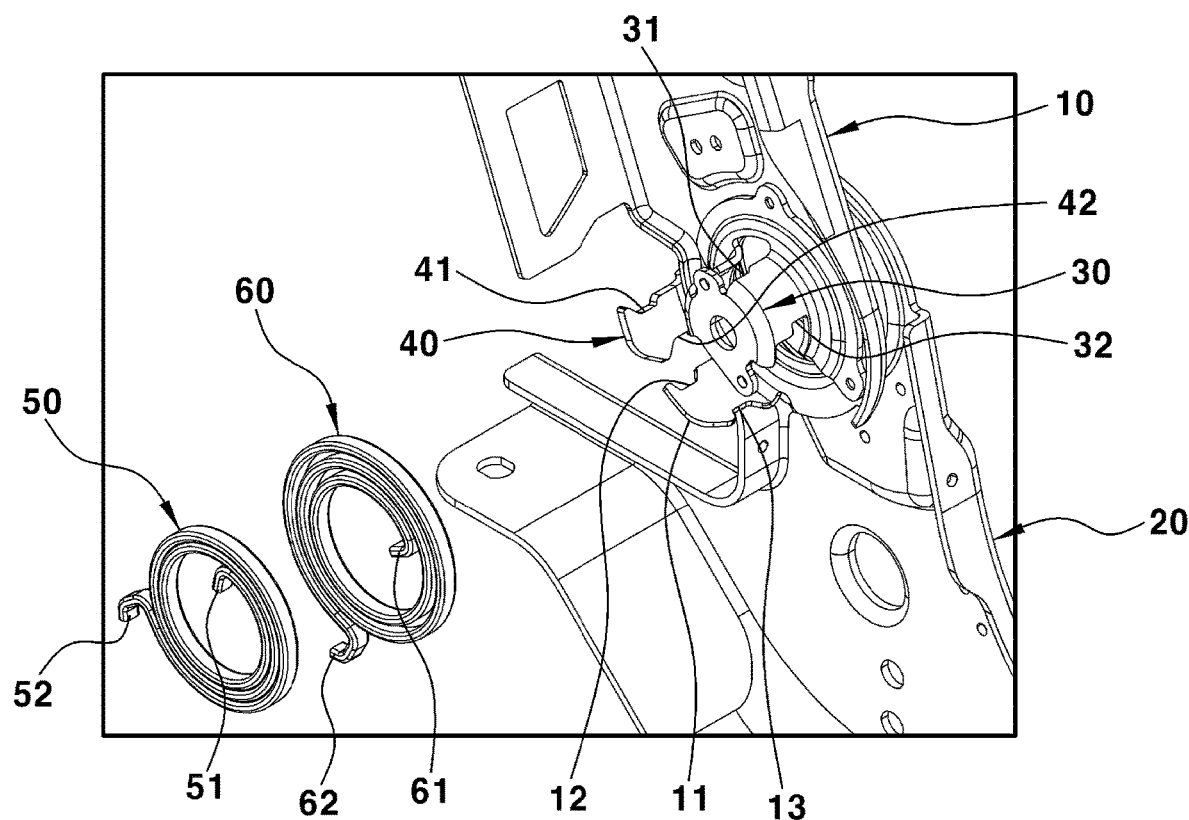

[FIG. 6]
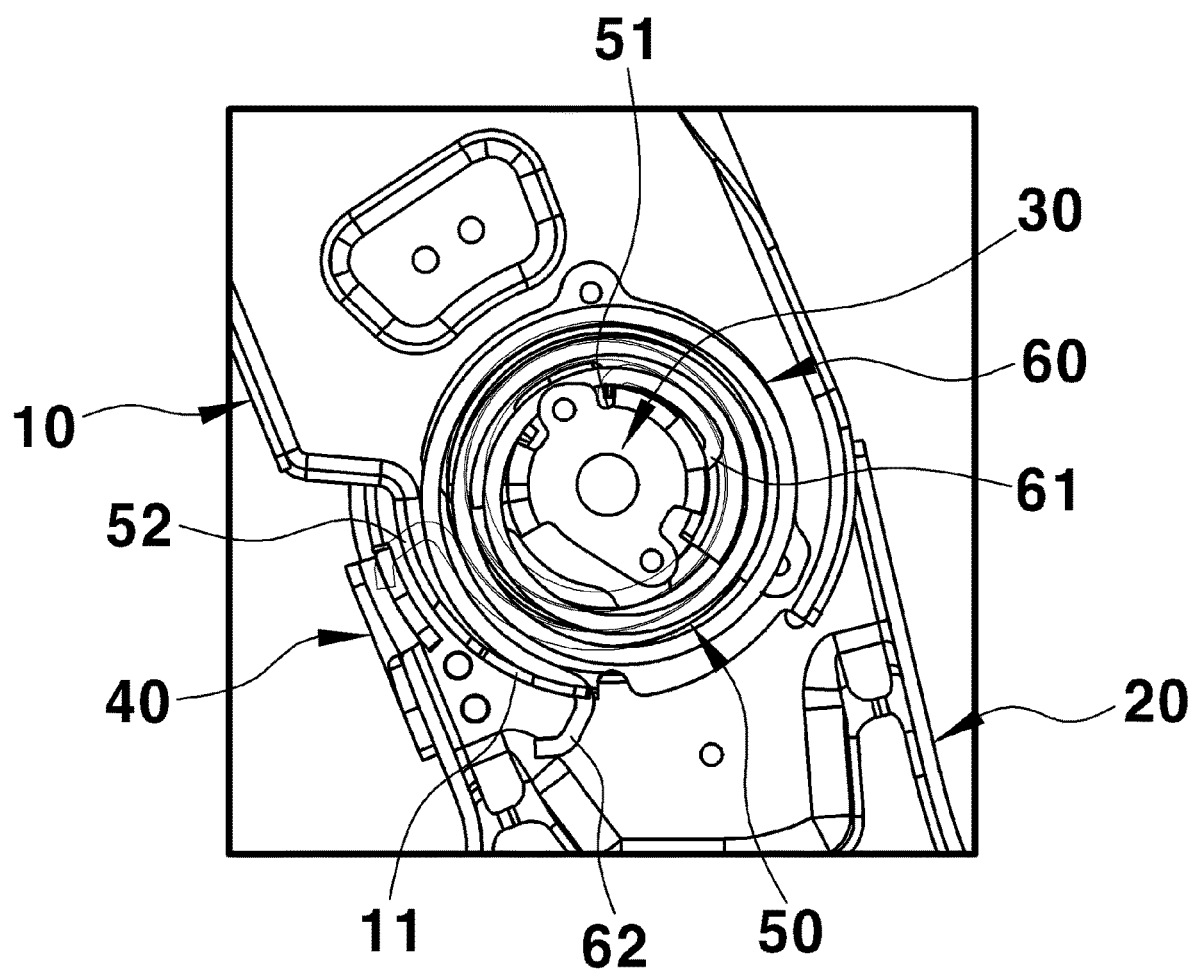

[FIG. 7]
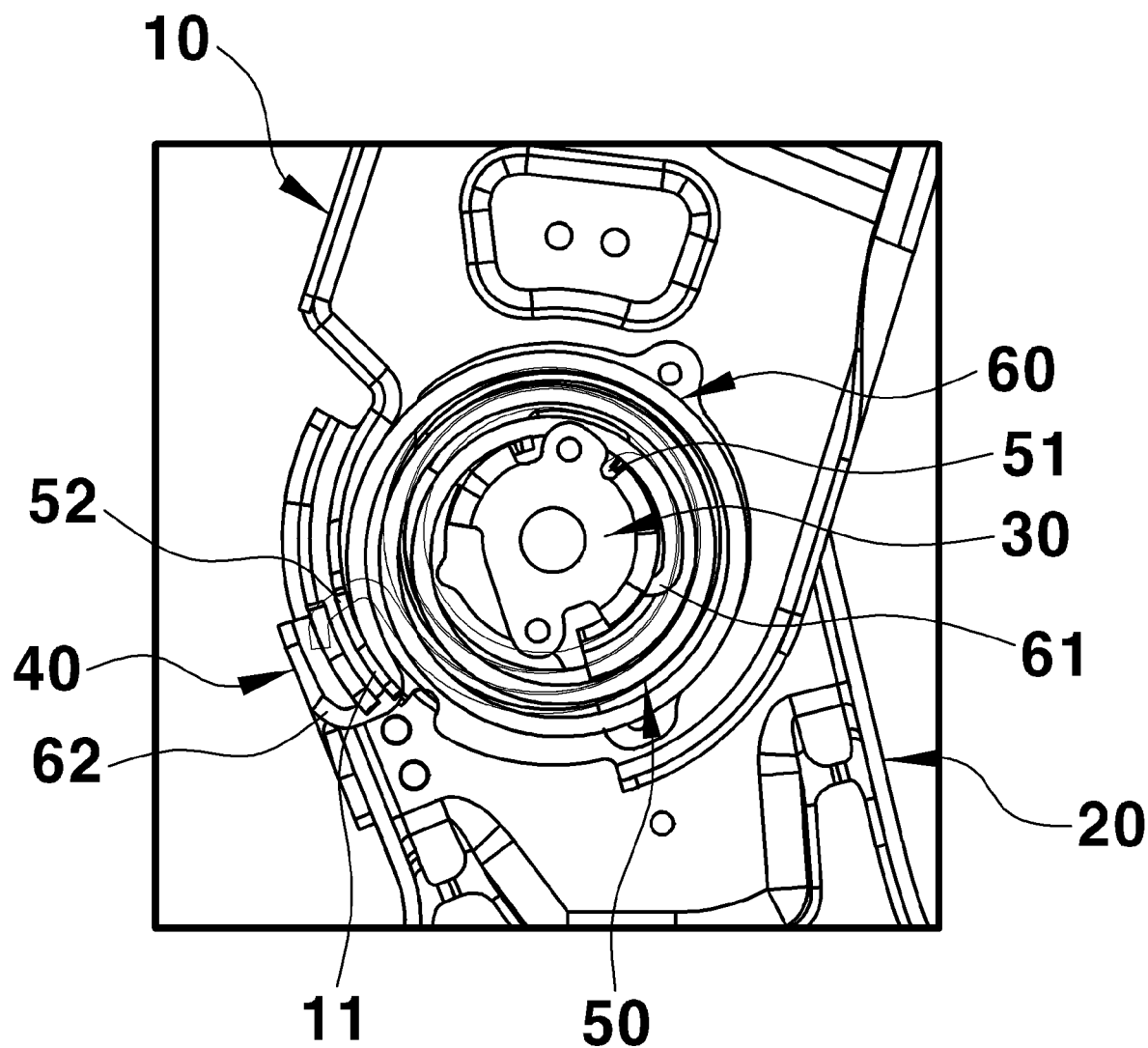

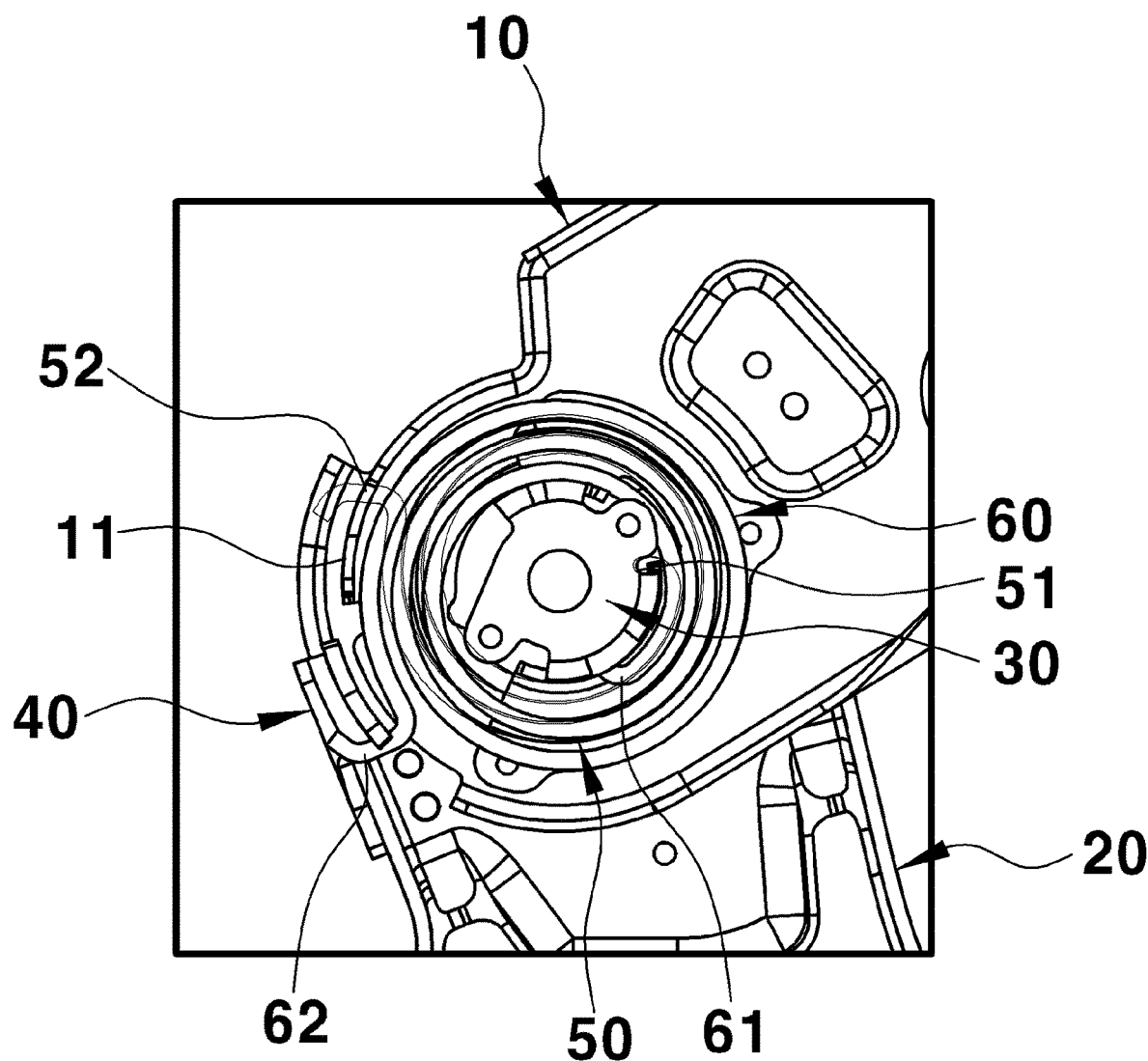
[FIG. 8]

VEHICLE SEATBACK FOLDING DEVICE

CROSS-REFERENCE TO RELATED APPLICATIONS

This patent application is a U.S. national stage application of International Application No. PCT/KR2021/010866, filed Aug. 17, 2023, and the entire contents of which are incorporated herein by reference, which claims priority to KR 10-2020-0104996, filed Aug. 21, 2020, and the entire contents of which are incorporated herein by reference.

TECHNICAL FIELD

The present disclosure relates to a vehicle seatback folding device, and more particularly to a vehicle seatback folding device capable of improving a folding speed problem when a seatback is folded and an unfolding force problem.

BACKGROUND ART

A vehicle has a seat installed therein and configured to allow an occupant to sit thereon. In general, a vehicle seat includes a seat cushion configured to support the lower body of an occupant and a seatback configured to support the upper body of an occupant.

In addition, a headrest configured to support the occupant's head and neck is mounted on the upper portion of the seatback of the vehicle seat.

The vehicle seat further includes an armrest configured to allow an occupant to put his or her arm thereon, a cup holder capable of holding a beverage container such as a can, a bottle, or a cup therein, a recliner configured to adjust the front and rear angles of the seatback, and a position adjustment device configured to adjust the front and rear positions of the seat.

In addition, in vehicles such as SUVs and hatchbacks in which a trunk and an interior space are not completely separated, a seatback of the second row seat may be configured to be foldable forwards, and by folding the seatback of the second row seat forwards, the interior space of the rear seat may be expanded.

For example, in the case of the second row seat configured as a folding seat, after the seatback is folded forwards, the upper space of the folded seatback may be used as a cargo loading space.

Meanwhile, a description will be given as to a known folding device configured to fold a seatback. A back side frame (or upper arm bracket) installed on the seatback and a cushion bracket (or lower arm bracket) installed on the seat cushion are hinged by a hinge shaft.

As described above, the back side frame is hinged to the cushion bracket, thereby enabling the seatback to be folded forwards from the seat cushion.

In addition, a hinge bracket is installed on the back side frame, and a restoring spring is mounted around the hinge shaft.

Accordingly, when a user operates an operation lever to start seatback folding operation, elastic restoring force of the restoring spring acts on the back side frame through the hinge bracket, and as such, the seatback may be automatically folded forwards by the elastic restoring force of the restoring spring.

However, in the above-described conventional technology, when the seatback is folded forwards, there is a problem in that the seatback is rotated forwards at high speed due to its own weight, which may cause injury to an occupant.

Further, when the seatback is unfolded again in the folded state, there is also a problem that it is not easy to unfold the seatback because force required to unfold the seatback (unfolding force) is significantly large due to tension of the restoring spring.

DISCLOSURE

Technical Problem

Therefore, the present device has been made in view of the above problems, and it is an object of the present disclosure to provide a vehicle seatback folding device capable of solving a folding speed problem when a seatback is folded and an unfolding force problem.

Technical Solution

In accordance with the present disclosure, the above and other objects can be accomplished by the provision of a vehicle seatback folding device including a cushion bracket integrally coupled to a seat cushion, a back side frame integrally coupled to a seatback and hinged to the cushion bracket, the back side frame being rotated on the cushion bracket when the seatback is folded or unfolded, a spring mounting bracket integrally coupled to the back side frame, wherein the spring mounting bracket is configured to rotate with the back side frame around a hinge shaft coupling the cushion bracket and the back side frame, a restoring spring configured to apply, when a first end of the restoring spring is fixedly coupled to the spring mounting bracket, and a second end thereof is caught and supported by a fixed support end integrally provided in the cushion bracket, elastic restoring force to the back side frame so as to allow the back side frame to be rotated in a folding direction of the seatback, and a reverse spring has a first end fixedly coupled to the spring mounting bracket and a second end supported while being caught by a first spring support end integrally provided on the back side frame in an unfolded state of the seatback.

When the back side frame is rotated by a predetermined angle or more in the folding direction with the seatback, the second end of the restoring spring may be caught and supported by a second spring support end integrally provided on the back side frame, and the reverse spring may apply elastic restoring force to the back side frame so as to allow the back side frame to be rotated in an unfolding direction of the seatback while the second end thereof is caught and supported by a stopper end integrally provided in the cushion bracket.

The restoring spring and the reverse spring may be spiral springs respectively disposed around the hinge shaft coupling the cushion bracket and the back side frame, the first ends of the restoring spring and the reverse spring may be inner ends located radially inwards in a spiral shape of the spring, and the second ends of the restoring spring and reverse spring may be outer ends located radially outwards in the spiral shape of the spring.

The restoring spring and the reverse spring may be installed to be located on a side portion of each other so as to have an overlapping arrangement structure.

The cushion bracket may have a base bracket integrally installed therein, and the base bracket may have the fixed support end and the stopper end respectively formed thereon.

The back side frame may have a bracket portion formed to protrude laterally therefrom, and the bracket portion may have the first spring support end and the second spring support end respectively formed thereon.

The base bracket may be installed to have a structure protruding laterally from the cushion bracket, and may have the fixed support end formed at one side end thereof and the stopper end formed at the other side end thereof on an opposite side of the one side end.

The back side frame may have a bracket portion formed to protrude laterally therefrom and formed to be integrated therewith, and the bracket portion may have the first spring support end formed at one side end thereof and the second spring support end formed at the other side end thereof on an opposite side of the one side end.

A movement trajectory of the bracket portion may be set to pass through an inside of the base bracket installed in the cushion bracket during rotation of the back side frame.

The fixed support end may be formed at the one side end of the base bracket and may be formed in a concave groove shape enabling the second end of the restoring spring to be inserted thereinto and caught therein, and the stopper end may be formed at the other side end of the base bracket on the opposite side of the one side end and may be formed in a concave groove shape enabling the second end of the reverse spring to be inserted thereinto and caught therein.

The second end of the restoring spring and the second end of the reverse spring may be bent radially outwards so as to be respectively insertable into the fixed support end and the stopper end formed in the concave groove shape.

The first spring support end may be formed at the one side end of the bracket portion and may be formed in a concave groove shape enabling the second end of the reverse spring to be inserted thereinto and caught therein, and the second spring support end may be formed at the other side end of the bracket portion on the opposite side of the one side end and may be formed in a concave groove shape enabling the second end of the restoring spring to be inserted thereinto and caught therein.

The second end of the reverse spring and the second end of the restoring spring may be bent radially outwards so as to be respectively insertable into the first spring support end and the second spring support end formed in the concave groove shape.

Advantageous Effects

Thus, in a vehicle seatback folding device according to the present disclosure, after a seatback is folded to a certain extent, folding force and folding speed may be reduced, thereby preventing an occupant from being injured by the seatback.

In addition, since elastic restoring force of a reverse spring assists in unfolding the seatback, force required to unfold the seatback (unfolding force) may be reduced, thereby making it possible to improve user convenience.

BRIEF DESCRIPTION OF VIEWS OF THE DRAWINGS

The above and other objects, features and other advantages of the present device will be more clearly understood from the following detailed description taken in conjunction with the accompanying drawings, in which:

FIG. 1 is a view showing a folded state of a seat and an unfolded state thereof;

FIG. 2 is an assembled perspective view showing a configuration of a seatback folding device according to the present disclosure;

FIG. 3 is an exploded perspective view showing the configuration of the seatback folding device according to the present disclosure;

FIG. 4 is a perspective view showing a restoring spring separated from the seatback folding device according to the present disclosure;

FIG. 5 is a perspective view showing the restoring spring and a reverse spring separated from the seatback folding device according to the present disclosure; and FIGS. 6 to 8 are perspective views showing the operating state of the seatback folding device according to the present disclosure.

DETAILED DESCRIPTION

Hereinafter, embodiments of the present device will be described in detail with reference to the accompanying drawings so that those skilled in the art to which the present disclosure pertains may easily carry out the present device.

Specific structural or functional descriptions given in connection with the embodiments of the present device are merely illustrative for the purpose of describing embodiments according to the concept of the present disclosure, and the embodiments according to the concept of the present disclosure may be implemented in various forms. Further, the present disclosure should not be construed as being limited to the embodiments described in this specification. On the contrary, the present disclosure is intended to cover not only the embodiments, but also various alternatives, modifications, equivalents, and other embodiments, which may be included within the spirit and scope of the present device as defined by the appended claims.

The same reference numerals represent the same components throughout the specification. Additionally, the terms in the specification are used merely to describe embodiments, and are not intended to limit the present disclosure. In this specification, an expression in a singular form also includes a plural form, unless clearly specified otherwise in context. When a portion "comprises" or "includes" a certain component throughout the specification, this means that the portion may further comprise or include other components without excluding the other components unless stated otherwise.

FIG. 1 is a view showing a folded state of a seat and an unfolded state thereof. Further, FIG. 2 is an assembled perspective view showing a configuration of a seatback folding device according to an embodiment of the present device, and FIG. 3 is an exploded perspective view showing the configuration of the seatback folding device according to the embodiment of the present disclosure.

Additionally, FIG. 4 is a perspective view showing a restoring spring separated from the seatback folding device according to the embodiment of the present disclosure, and FIG. 5 is a perspective view showing the restoring spring and a reverse spring separated from the seatback folding device according to the embodiment of the present disclosure.

Reference numeral 10 denotes a member installed to be fixed to a seatback 1 in FIG. 1, and this member may be a back side frame (or upper arm bracket).

Reference numeral 20 is a member installed to be fixed to a seat cushion 2 in FIG. 1, and this member may be a cushion bracket (or lower arm bracket).

The above-mentioned members are components configured to fold and unfold the seatback 1 with respect to the seat cushion 2, and the back side frame 10 is rotatably hinged to the cushion bracket 20 by a hinge shaft 70.

Accordingly, the seatback 1 may be rotated on the seat cushion 2 around a hinge coupling portion located at the lower end thereof, and may be folded or unfolded according to the rotation direction thereof, as shown in FIG. 1.

In the present disclosure, seatback folding means that the seatback 1 is rotated forwards toward the seat cushion around the lower end thereof which is the hinge coupling portion with the seat cushion 2, thereby overlapping the seat cushion.

Here, the hinge coupling portion is a portion at which the back side frame 10 and the cushion bracket 20 are hinged through the hinge shaft 70, and the same is a portion that becomes the center of rotation of the seatback 1 and the back side frame 10 installed therein when the seatback is folded.

Further, in the present disclosure, seatback unfolding means that the folded seatback 1 is rotated in the direction opposite the rotational direction of the seatback 1 when the seatback 1 is folded forwards so as to allow a user to lean his or her back against the seatback 1 after sitting on the seat cushion 2.

The seatback folding device according to the embodiment of the present disclosure may include the back side frame 10, the cushion bracket 20, a spring mounting bracket 30, a base bracket 40, a restoring spring 50, and a reverse spring 60.

As described above, the back side frame 10 is a member integrally coupled to the seatback 1 in FIG. 1, and the cushion bracket 20 is a member integrally coupled to the seat cushion 2 in FIG. 1.

In this case, the spring mounting bracket 30 is integrally coupled to the back side frame 10, and the same is a rotating element configured to rotate with the back side frame 10 when the seatback is folded or unfolded.

The base bracket 40 is integrally coupled to the cushion bracket 20, and the same is a fixed element constantly fixed to the side of the seat cushion 2 without movement when the seatback 1 is folded or unfolded.

In short, the spring mounting bracket 30 is a bracket installed on the back side frame 10 and configured to rotate around the hinge shaft 70 with the back side frame when the seatback 1 is folded, and the base bracket 40 is a bracket installed in the cushion bracket 20 and constantly fixed thereto without rotation.

The spring mounting bracket 30 is a bracket to which one end of each of the restoring spring 50 and the reverse spring 60 (the inner end of each spring) is fixed. Here, the spring mounting bracket 30 has a first coupling portion 31 formed on one side thereof, the first coupling portion 31 having a first end 51 of the restoring spring 50 coupled thereto, and a second coupling portion 32 formed on the other side thereof, the second coupling portion 32 having a first end 61 of the reverse spring 60 coupled thereto.

The base bracket 40 is installed in a structure protruding laterally from the cushion bracket 20. Here, the base bracket 40 has a fixed support end 41 formed on one side thereof, the fixed support end 41 supporting a second end 52 of the restoring spring 50 in a state in which the second end 52 is caught by the fixed support end 41, and a stopper end 42 formed on the other side thereof, the stopper end 42 supporting a second end 62 of the reverse spring 60 in a state in which the second end 62 is caught by the stopper end 42.

The fixed support end 41 and the stopper end 42 may be respectively formed at opposite side ends of the base bracket 40, and each side end of the base bracket 40 may be formed in a concave groove shape so that each of the second end 52 of the restoring spring 50 and the second end 62 of the reverse spring 60 is inserted into a corresponding one of the side ends to be caught and supported thereby.

In addition, the back side frame 10 has a bracket portion 11 integrally provided at the lower end thereof and formed to protrude laterally therefrom. When the seatback is folded or unfolded, the bracket portion 11 is also moved along the rotational trajectory while the back side frame 10 is rotated around the hinge shaft 70.

The bracket portion 11 has a first spring support end 13 formed on one side thereof, the first spring support end 13 supporting the second end 62 of the reverse spring 60 in a state in which the second end 62 is caught by the first spring support end 13, and a second spring support end 12 formed on the other side thereof, the second spring support end 12 supporting the second end 52 of the restoring spring 50 in a state in which the second end 52 is caught by the second spring support end 12.

The first spring support end 13 and the second spring support end 12 may be respectively formed at opposite side ends of the bracket portion 11, and each side end of the bracket portion 11 may be formed in a concave groove shape so that each of the second end 52 of the restoring spring 50 and the second end 62 of the reverse spring 60 is inserted into a corresponding one of the side ends to be caught and supported thereby.

Accordingly, the first spring support end 13 and the second spring support end 12 may be integrally provided on the back side frame 10, and the fixed support end 41 and the stopper end 42 may be integrally provided on the cushion bracket 20.

In the embodiment of the present disclosure, the bracket portion 11 formed on the back side frame 10 and the base bracket 40 integrally installed in the cushion bracket 20 may be formed to respectively protrude from the back side frame 10 and the cushion bracket 20 toward one side, that is, formed to protrude in the same direction.

In this case, when the back side frame 10 is rotated when the seatback is folded or unfolded, the bracket portion 11 formed on the back side frame 10 should not collide with or interfere with the base bracket 40 fixed to the cushion bracket 20.

To this end, when the back side frame 10 is rotated, the movement trajectory of the bracket portion 11 is set to pass through the inside of the base bracket 40 fixed to the cushion bracket 20.

In the embodiment shown in FIGS. 2 to 5, when the back side frame 10 is rotated, the bracket portion 11 is set to pass through the inside of the base bracket 40 fixed to the cushion bracket 20.

In addition, both the restoring spring 50 and the reverse spring 60 may be spiral springs disposed around the hinge shaft 70 which is the rotational center of the back side frame 10 and the seatback.

In this case, both the restoring spring 50 and the reverse spring 60 may be installed so as to have an overlapping arrangement structure in which the two springs 50 and 60 are located on the side portion of each other while being disposed around the hinge shaft 70.

Referring to FIGS. 2 to 5, it may be seen that the reverse spring 60 is disposed radially inwards and the restoring spring 50 is disposed radially outwards, but this arrangement is merely an example. Conversely, the restoring spring 50 may be disposed radially inwards and the reverse spring 60 may be disposed radially outwards.

In this manner, since the two springs 50 and 60 are disposed to be located on the side portion of each other, the positions of the two springs 50 and 60 may be different from the embodiment in the drawing. Further, depending on the positions of the two springs 50 and 60, the positions of the fixed support end 41 and the stopper end 42 in the base bracket 40 and the positions of the first spring support end 13 and the second spring support end 12 in the bracket portion 11 should be appropriately set or changed.

In addition, the restoring spring 50 is provided so that elastic restoring force acts in the folding direction of the seatback, and the reverse spring 60 is provided so that elastic restoring force acts in the unfolding direction opposite the folding direction of the seatback.

To this end, the restoring spring 50 and the reverse spring 60 may be spiral springs wound in opposite directions.

In the restoring spring 50, the first end 51 is coupled to and fixed to the first coupling portion 31 of the spring mounting bracket 30, and the second end 52 on the opposite side of the first end 51 is supported while being caught by the fixed support end 41 of the base bracket 40 in the initial setting state.

Here, the first end 51 of the restoring spring 50 is an inner end located inwards in the spiral shape of the restoring spring, and the second end 52 thereof is an outer end located outwards in the spiral shape thereof.

In the reverse spring 60, the first end 61 is coupled to and fixed to the second coupling portion 32 of the spring mounting bracket 30, and the second end 62 on the opposite side of the first end 61 is supported while being caught by the first spring support end 13 of the bracket portion 11 in the initial setting state.

Here, the first end 61 of the reverse spring 60 becomes an inner end located radially inwards in the spiral shape of the reverse spring, and the second end 62 thereof is an outer end located radially outwards in the spiral shape thereof.

The second ends 52 and 62, which are respective outer ends of the restoring spring 50 and the reverse spring 60, are formed to be bent radially outwards so as to be inserted into and caught by the support ends 12, 13, and 41 or the stopper end 42 formed in a concave groove shape.

Hereinafter, the operating state of the seatback folding device according to the embodiment of the present disclosure will be described.

FIGS. 6 to 8 are perspective views showing the operating state of the seatback folding device according to the embodiment of the present disclosure.

FIG. 6 shows the initial setting state, and FIGS. 7 and 8 show sequential operating states while the seatback is folded.

In the present disclosure, the first end 51 of the restoring spring 50 is coupled to the first coupling portion (reference numeral "31" in FIGS. 3 and 5) of the spring mounting bracket 30, and the first end 61 of the reverse spring 60 is coupled to the second coupling portion (reference numeral "32" in FIGS. 3 and 5) of the spring mounting bracket 30.

Each of the first ends 51 and 61, which are the respective inner ends of the two springs 50 and 60, is constantly coupled to a corresponding one of the coupling portions 31 and 32 of the spring mounting bracket 30 regardless of the operating state of the seatback 1.

On the other hand, the second end 52 of the restoring spring 50 is supported while being caught by the fixed support end (reference numeral "41" in FIGS. 3 and 5) of the base bracket 40 (refer to FIG. 6), and when the seatback 1 is folded (that is, the seatback is rotated forwards) by a predetermined angle or more during folding operation of the seatback (reference numeral "1" in FIG. 1), the second end 52 of the restoring spring 50 is moved to and caught by the second spring support end (reference numeral "12" in FIGS. 3 and 5) of the bracket portion 11 integrally provided on the back side frame 10 (refer to FIG. 8).

Furthermore, the second end 62 of the reverse spring 60 is supported while being caught by the first spring support end (reference numeral "13" in FIGS. 3 and 5) of the bracket portion 11 (refer to FIG. 6), and when the seatback 1 is folded (that is, the seatback is rotated forwards) by a predetermined angle or more during folding operation of the seatback 1, the second end 62 of the reverse spring 60 is moved to and caught by the stopper end (reference numeral "42" in FIGS. 3 and 5) of the base bracket 40 (refer to FIG. 8).

The initial setting state shown in FIG. 6 is a state before the folding operation of the seatback 1 starts, and a user may sit on the seat cushion and lean his or her back against the seatback 1 in this initial setting state.

More specifically, with reference to the drawings, in the initial setting state, that is, in the state before the seatback 1 is folded, the second end 52, which is the outer end of the restoring spring 50, is caught by the fixed support end 41 of the base bracket 40.

Here, the second end 62, which is the outer end of the reverse spring 60, is caught by the first spring support end 13 of the bracket portion 11.

Additionally, as described above, the first end 51 of the restoring spring 50 is in the state of being coupled to the first coupling portion 31 of the spring mounting bracket 30, and the first end 61 of the reverse spring 60 is in the state of being coupled to the second coupling portion 32 of the spring mounting bracket 30.

In this initial setting, since the first end 51 of the restoring spring 50 is coupled to the spring mounting bracket 30, which is a rotating element, and the second end 52 of the restoring spring 50 is coupled to the base bracket 40, which is a fixed element, elastic restoring force of the restoring spring 50 acts in the folding direction of the seatback 1.

Therefore, when folding of the seatback 1 starts in the initial setting state as shown in FIG. 6, the back side frame 10 and the spring mounting bracket 30 are rotated simultaneously by the elastic restoring force of the restoring spring 50, and the seatback 1 may be automatically folded.

Additionally, in the initial setting, the first end 61 of the reverse spring 60 is coupled to the spring mounting bracket 30, which is a rotating element, and the second end 62 of the reverse spring 60 is coupled to the bracket portion 11 configured to rotate in the same manner as the spring mounting bracket 30. Accordingly, even if the seatback 1 is folded from the initial setting state to a predetermined angle, which is an initial folding section, the reverse spring 60 is rotated with the spring mounting bracket 30.

For reference, the bracket portion 11 is integrally provided on the back side frame 10 and the spring mounting bracket 30 is integrally fixed to and installed on the back side frame 10. Accordingly, when the back side frame 10 is rotated during folding or unfolding of the seatback 1, the bracket portion 11 and the spring mounting bracket 30 are rotated together.

Therefore, in the initial folding section of the seatback 1, the reverse spring 60 is not deformed, force of the reverse spring 60 does not act on other components, and only elastic restoring force of the restoring spring 50 acts as force to fold the seatback 1.

Then, when the seatback 1 is rotated by a predetermined angle, the same is in the state shown in FIG. 7. When the back side frame 10 and the spring mounting bracket 30 are rotated and the seatback 1 reaches the predetermined angle during folding operation of the seatback 1, the second spring support end 12 of the bracket portion 11 reaches the position of the fixed support end 41 of the base bracket 40.

That is, as shown in FIG. 7, the second spring support end 12 of the bracket portion 11 and the fixed support end 41 of the base bracket 40 intersect each other. In this case, the second end 52 of the restoring spring 50 caught by the fixed support end 41 of the base bracket 40 is caught by the second spring support end 12 of the bracket portion 11.

Accordingly, when the seatback 1 is further folded in the state shown in FIG. 7, the back side frame 10 and the spring mounting bracket 30 are further rotated. Then, as shown in FIG. 8, the second end 52 of the restoring spring 50 is moved from the fixed support end 41 of the base bracket 40 to the second spring support end 12 of the bracket portion 11, thereby being supported by the second spring support end 12.

Thereafter, while the seatback 1 is folded, the second end 52 of the restoring spring 50 is supported while being caught by the second spring support end 12 of the bracket portion 11, as shown in FIG. 8.

In this manner, in the state in which the second end 52 of the restoring spring 50 is caught by the second spring support end 12, both the first end 51 and the second end 52 of the restoring spring 50 are coupled to the spring mounting bracket 30 and the bracket portion 11, which are rotating elements. Accordingly, when the seatback 1 is folded, the restoring spring 50 is rotated with the spring mounting bracket 30.

Accordingly, when the seatback 1 is folded, the restoring spring 50 is not deformed and force of the restoring spring 50 does not act on other components.

Then, when the seatback 1 and the back side frame 10 are rotated by a predetermined angle, the first spring support end 13 of the bracket portion 11 reaches the position of the stopper end 42 of the base bracket 40.

That is, the first spring support end 13 of the bracket portion 11 and the stopper end 42 of the base bracket 40 intersect each other. In this case, the second end 62 of the reverse spring 60 caught by the first spring support end 13 of the bracket portion 11 is caught by the stopper end 42 of the base bracket 40.

As a result, when the seatback 1 is further folded in the state shown in FIG. 7, the back side frame 10 and the spring mounting bracket 30 are further rotated, and the second end 62 of the reverse spring 60 is moved from the first spring support end 13 of the bracket portion 11 to the stopper end 42 of the base bracket 40.

Then, while the seatback 1 is folded, the second end 62 of the reverse spring 60 is supported while being caught by the stopper end 42 of the base bracket 40, as shown in FIG. 8.

In this manner, in the state in which the second end 62 of the reverse spring 60 is caught by the stopper end 42 of the base bracket 40, the first end 61 of the reverse spring 60 is coupled to the spring mounting bracket 30, which is a rotating element, and the second end 62 of the reverse spring 60 is coupled to the base bracket 40, which is a fixed element. Accordingly, elastic restoring force of the reverse spring 60 acts on the spring mounting bracket 30.

FIG. 8 shows a state in which the seatback 1 is further folded in the state shown in FIG. 7, and the first spring support end 13 of the spring mounting bracket 30 passes through the stopper end 42 of the base bracket 40.

In this state, the first end 51 and the second end 52 of the restoring spring 50 are respectively coupled to the spring mounting bracket 30 and the bracket portion 11, which are rotating elements. Accordingly, when the seatback 1 is folded, the restoring spring 50 is rotated with the back side frame 10 and the spring mounting bracket 30, and as such, force of the restoring spring 50 does not act on other components.

On the other hand, in the case of the reverse spring 60, since the first end 61 is coupled to the spring mounting bracket 30 and the second end 62 is coupled to the stopper end 42 of the base bracket 40, the elastic restoring force acts in the unfolding direction opposite the folding direction of the seatback 1.

As described above, from the time at which the elastic restoring force of the reverse spring 60 acts in the unfolding direction of the seatback 1, the seatback 1 may be folded by its own weight. Here, since the elastic restoring force of the reverse spring 60 acts in the direction opposite the folding direction (direction opposite the direction of its own weight), the folding speed may be reduced even if the seatback 1 is folded by its own weight, thereby making it possible to prevent an occupant from being injured by the seatback 1.

In addition, when the seatback 1 is unfolded from the folded state, the seatback folding device according to the embodiment of the present disclosure operates in the reverse order of folding operation of the seatback 1. Particularly, in the initial unfolding section at which unfolding of the seatback 1 starts, since elastic restoring force of the reverse spring 60 acts in the unfolding direction of the seatback 1, force required to unfold the seatback 1 (unfolding force) may be reduced.

As described above, in the seatback folding device according to the embodiment of the present disclosure, after the seatback is folded forwards to a certain extent, folding force and folding speed may be reduced, thereby making it possible to prevent an occupant from being injured by the seatback.

In addition, since elastic restoring force of the reverse spring assists in unfolding of the seatback, force required to unfold the seatback (unfolding force) may be reduced, and as such, user convenience may be improved.

Although preferred embodiments of the present disclosure have been described in detail above, the scope of the present disclosure is not limited thereto, and those skilled in the art will appreciate that various modifications, additions and substitutions are possible, without departing from the scope and spirit of the present device as disclosed in the accompanying claims.

What is claimed is:
1. A vehicle seatback folding device comprising:
a cushion bracket integrally coupled to a seat cushion;
a back side frame integrally coupled to a seatback and hinged to the cushion bracket, the back side frame being rotated on the cushion bracket when the seatback is folded or unfolded;
a spring mounting bracket integrally coupled to the back side frame, wherein the spring mounting bracket is configured to rotate with the back side frame around a hinge shaft coupling the cushion bracket and the back side frame;
a restoring spring including a first end and a second end, the first end fixedly coupled to the spring mounting bracket, the second end caught and supported by a fixed support end integrally provided in the cushion bracket, the restoring spring configured to apply elastic restor- ing force to the back side frame so as to allow the back side frame to be rotated in a folding direction of the seatback; and a reverse spring including a first end fixedly coupled to the spring mounting bracket and a second end supported while being caught by a first spring support end integrally provided on the back side frame in an unfolded state of the seatback, wherein the restoring spring and the reverse spring are spiral springs respectively disposed around the hinge shaft coupling the cushion bracket and the back side frame, wherein the first end of the restoring spring and the first end of the reverse spring are inner ends located radially inwards in a spiral shape of the spring, and wherein the second end of the restoring spring and the second end of the reverse spring are outer ends located radially outwards in the spiral shape of the spring.

2. The vehicle seatback folding device according to claim 1, wherein, when the back side frame is rotated by a predetermined angle or more in the folding direction with the seatback, the second end of the restoring spring is caught and supported by a second spring support end integrally provided on the back side frame, and the reverse spring applies elastic restoring force to the back side frame so as to allow the back side frame to be rotated in an unfolding direction of the seatback while the second end thereof is caught and supported by a stopper end integrally provided in the cushion bracket.

3. The vehicle seatback folding device according to claim 1, wherein the restoring spring and the reverse spring are installed to be located on a side portion of each other so as to have an overlapping arrangement structure.

4. The vehicle seatback folding device according to claim 2, wherein the cushion bracket includes a base bracket integrally installed therein, and wherein the base bracket includes the fixed support end and the stopper end respectively formed thereon.

5. The vehicle seatback folding device according to claim 4, wherein the back side frame includes a bracket portion formed to protrude laterally therefrom, and wherein the bracket portion includes the first spring support end and the second spring support end respectively formed thereon.

6. The vehicle seatback folding device according to claim 4, wherein the base bracket includes a structure protruding laterally from the cushion bracket, and includes the fixed support end formed at one side end thereof and the stopper end formed at the other side end thereof on an opposite side of the one side end.

7. The vehicle seatback folding device according to claim 6, wherein the back side frame includes a bracket portion formed to protrude laterally therefrom and formed to be integrated therewith, wherein the bracket portion includes the first spring support end formed at one side end thereof and the second spring support end formed at the other side end thereof on an opposite side of the one side end.

8. The vehicle seatback folding device according to claim 7, wherein a movement trajectory of the bracket portion forms a radially inward passage with respect to a movement trajectory of the base bracket installed in the cushion bracket during rotation of the back side frame.

9. The vehicle seatback folding device according to claim 7 wherein the fixed support end is formed at the one side end of the base bracket and is formed in a concave groove shape enabling the second end of the restoring spring to be inserted thereinto and caught therein, and wherein the stopper end is formed at the other side end of the base bracket on the opposite side of the one side end and is formed in a concave groove shape enabling the second end of the reverse spring to be inserted thereinto and caught therein.

10. The vehicle seatback folding device according to claim 9, wherein the second end of the restoring spring and the second end of the reverse spring are bent radially outwards so as to be respectively insertable into the fixed support end and the stopper end formed in the concave groove shape.

11. The vehicle seatback folding device according to claim 7, wherein the first spring support end is formed at the one side end of the bracket portion and is formed in a concave groove shape enabling the second end of the reverse spring to be inserted thereinto and caught therein, and wherein the second spring support end is formed at the other side end of the bracket portion on the opposite side of the one side end and is formed in a concave groove shape enabling the second end of the restoring spring to be inserted thereinto and caught therein.

12. The vehicle seatback folding device according to claim 11, wherein the second end of the reverse spring and the second end of the restoring spring are bent radially outwards so as to be respectively insertable into the first spring support end and the second spring support end formed in the concave groove shape.

13. A vehicle seatback folding device comprising:
a cushion bracket integrally coupled to a seat cushion;
a back side frame integrally coupled to a seatback and hinged to the cushion bracket, the back side frame being rotated on the cushion bracket when the seatback is folded or unfolded;
a spring mounting bracket integrally coupled to the back side frame, wherein the spring mounting bracket is configured to rotate with the back side frame around a hinge shaft coupling the cushion bracket and the back side frame;
a restoring spring including a first end and a second end, the first end fixedly coupled to the spring mounting bracket, the second end caught and supported by a fixed support end integrally provided in the cushion bracket, the restoring spring configured to apply elastic restoring force to the back side frame so as to allow the back side frame to be rotated in a folding direction of the seatback; and
a reverse spring including a first end fixedly coupled to the spring mounting bracket and a second end supported while being caught by a first spring support end integrally provided on the back side frame in an unfolded state of the seatback, wherein, when the back side frame is rotated by a predetermined angle or more in the folding direction with the seatback, the second end of the restoring spring is caught and supported by a second spring support end integrally provided on the back side frame, and the reverse spring applies elastic restoring force to the back side frame so as to allow the back side frame to be rotated in an unfolding direction of the seatback while the second end thereof is caught and supported by a stopper end integrally provided in the cushion bracket, wherein the cushion bracket includes a base bracket integrally installed therein, and wherein the base bracket includes the fixed support end and the stopper end respectively formed thereon.

14. The vehicle seatback folding device according to claim 13, wherein the back side frame includes a bracket portion formed to protrude laterally therefrom, and wherein the bracket portion includes the first spring support end and the second spring support end respectively formed thereon.

15. The vehicle seatback folding device according to claim 13, wherein the base bracket includes a structure protruding laterally from the cushion bracket, and includes the fixed support end formed at one side end thereof and the stopper end formed at the other side end thereof on an opposite side of the one side end.

16. The vehicle seatback folding device according to claim 15, wherein the back side frame includes a bracket portion formed to protrude laterally therefrom and formed to be integrated therewith, wherein the bracket portion includes the first spring support end formed at one side end thereof and the second spring support end formed at the other side end thereof on an opposite side of the one side end.

17. The vehicle seatback folding device according to claim 16, wherein a movement trajectory of the bracket portion forms a radially inward passage with respect to a movement trajectory of the base bracket installed in the cushion bracket during rotation of the back side frame.

18. The vehicle seatback folding device according to claim 16, wherein the fixed support end is formed at the one side end of the base bracket and is formed in a concave groove shape enabling the second end of the restoring spring to be inserted thereinto and caught therein, and wherein the stopper end is formed at the other side end of the base bracket on the opposite side of the one side end and is formed in a concave groove shape enabling the second end of the reverse spring to be inserted thereinto and caught therein.

19. The vehicle seatback folding device according to claim 18, wherein the second end of the restoring spring and the second end of the reverse spring are bent radially outwards so as to be respectively insertable into the fixed support end and the stopper end formed in the concave groove shape.

20. The vehicle seatback folding device according to claim 16, wherein the first spring support end is formed at the one side end of the bracket portion and is formed in a concave groove shape enabling the second end of the reverse spring to be inserted thereinto and caught therein, and wherein the second spring support end is formed at the other side end of the bracket portion on the opposite side of the one side end and is formed in a concave groove shape enabling the second end of the restoring spring to be inserted thereinto and caught therein.

\* \* \* \* \*